United States Patent [19]

Kimura

[11] Patent Number: 4,645,652
[45] Date of Patent: * Feb. 24, 1987

[54] METHOD FOR SCRUBBING SULFUR OXIDES AND NITROGEN OXIDES IN A FLUE GAS DUCT

[75] Inventor: Shiro G. Kimura, Schenectady, N.Y.

[73] Assignee: General Electric Company, Schenectady, N.Y.

[*] Notice: The portion of the term of this patent subsequent to Feb. 24, 2004 has been disclaimed.

[21] Appl. No.: 802,926

[22] Filed: Nov. 29, 1985

[51] Int. Cl.$^4$ .......................... B01J 21/00; B01J 8/00; C01B 17/00

[52] U.S. Cl. .................................. 423/235; 423/239; 423/242; 423/244

[58] Field of Search ................... 423/235, 235 D, 239, 423/239 A, 244 A, 244 R, 242 A, 242 R

[56] References Cited

U.S. PATENT DOCUMENTS

| | | | |
|---|---|---|---|
| 3,411,864 | 11/1968 | Pallinger | 423/244 |
| 4,081,513 | 3/1978 | Moss | 423/244 |
| 4,309,393 | 1/1982 | Nguyen | 423/244 |
| 4,324,770 | 4/1982 | Bakke | 423/244 |
| 4,519,995 | 5/1985 | Schrofelbauer et al. | 423/244 |
| 4,559,211 | 12/1985 | Feldman et al. | 423/244 |

OTHER PUBLICATIONS

"Acid Rain Prevention Thru New $SO_x/NO_x$ Dry Scrubbing Process", by Karston Felsvang & Per Morsing presented at the EPA/EPRI Symposium on Flue Gas Desulfurization, New Orleans, Louisiana, Nov. 1–4, 1983, Paper #10B.

"Overview and Evaluation of Two Years of Operation and Testing of the Riverside Spray Dryer System", by John M. Gutske, Wayne E. Morgan & Steven H. Wolf, presented at EPA/EPRI Symposium on Flue Gas Desulfurization, New Orleans, Louisiana, Nov. 1–4, 1983, Paper No. 10G.

"Design and Initial Operation of the Spray Dry FGD System at the Marquette Michigan Board of Light and Power Shiras #3 Plant by O. Fortune, T. F. Bechtel, E. Puska and J. Arello, presented at the EPA/EPRI Symposium on Flue Gas Desulfurization, New Orleans, LA, Nov. 1–4, 1983, Paper #10H.

*Primary Examiner*—Gregory A. Heller
*Attorney, Agent, or Firm*—William H. Steinberg; James C. Davis, Jr.; Paul R. Webb, II

[57] ABSTRACT

$SO_x$ and $NO_x$ are scrubbed from a flue gas stream by first introducing dry sorbent for $NO_x$ removal with controlled humidification downstream for $SO_x$ removal. The $SO_x$ and $NO_x$ removal may be performed in a flue gas duct to minimize the cost for retrofit applications.

4 Claims, 8 Drawing Figures

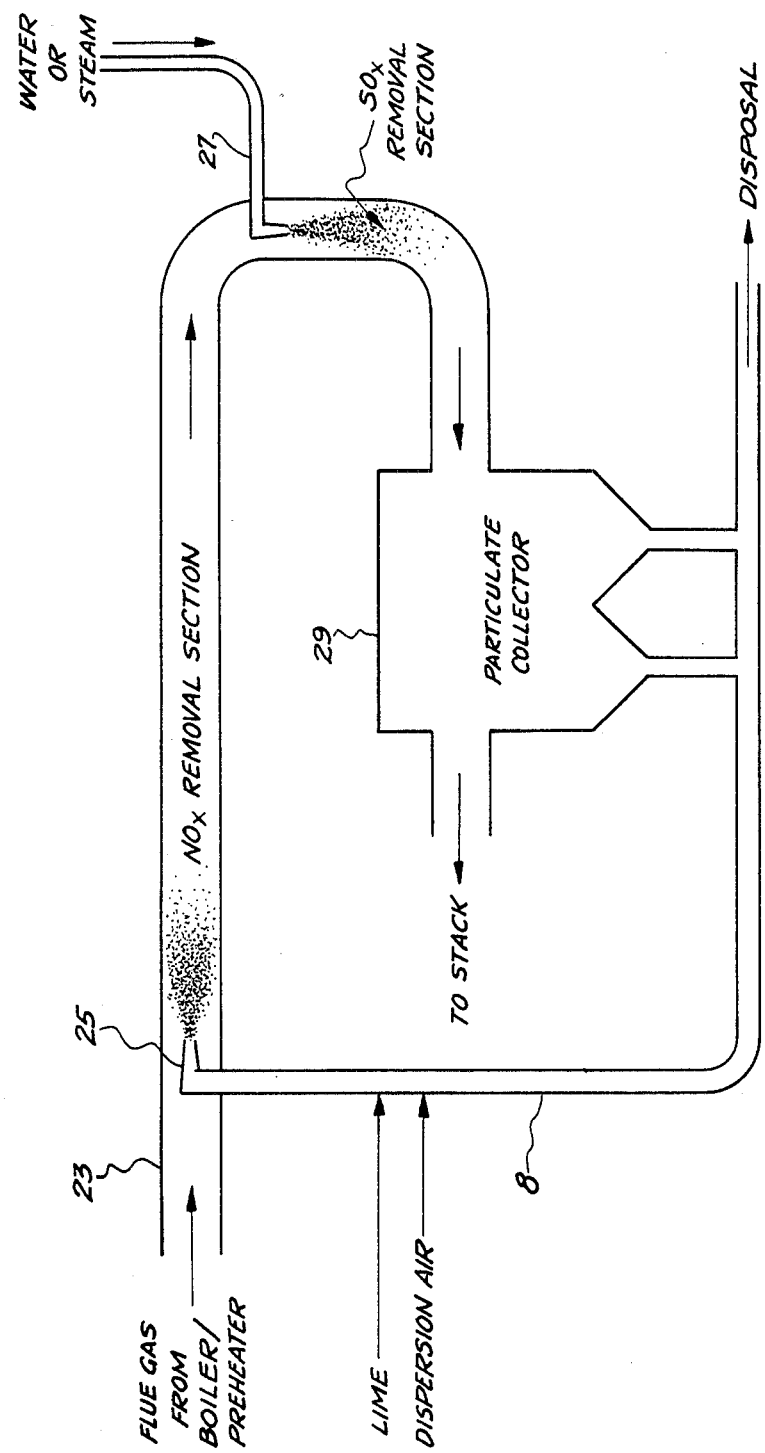

180
METHOD FOR SCRUBBING SULFUR OXIDES AND NITROGEN OXIDES IN A FLUE GAS DUCT

This application is related to my copending application Ser. No. 802,897 filed on even date herewith and assigned to the instant assignee.

BACKGROUND OF THE INVENTION

The present invention is related to a dry process for removal of sulfur oxides and nitrogen oxides in a flue gas duct.

The major contributors to acid rain are sulfur oxides, and nitrogen oxides. Sulfur oxides ($SO_x$) as an air pollutant, include sulfur dioxide ($SO_2$), sulfur trioxide ($SO_3$), plus the corresponding acids ($H_2SO_3$ and $H_2SO_4$) and salts (sulfites and sulfates). Nitrogen oxides ($NO_x$), in air pollution terminology refer to two gaseous oxides of nitrogen, nitrogen dioxide ($NO_2$) and nitric oxide (NO). The predominant species in flue gas are $SO_2$ and NO. $SO_x$ can generally be controlled reasonably well by flue gas desulfurization processes. Dry Flue Gas Desulfurization (DFGD), also called Spray Dry Flue Gas Desulfurization (SDFGD), is a sulfur dioxide scrubbing process in which lime slurries, or alternatively, sorbent solutions containing sodium compounds such as sodium bicarbonate, are contacted with flue gas in a device such as a spray dryer, in which the sulfur dioxide reacts with the sorbent material, and the water simultaneously evaporates. The resulting product is a dry mixture of $CaS_3$, $CaSO_4$ unreacted sorbent, and flyash. A baghouse located downstream from the spray absorber removes entrained particulates.

It is expected that acid rain regulations will require the scrubbing of nitrogen oxides ($NO_x$), as well as sulfur oxides ($SO_x$). Proposed targets for stack gas cleanup are 90% $SO_x$/90% $NO_x$ and 50% $SO_x$/50% $NO_x$ for new and retrofit applications, respectively. One of the major issues which inhibits the implementation of retrofit scrubbers by electric utilities in the high cost of the scrubbers and, thus, the resultant increased cost of electricity. Although chemistries to remove $SO_x$ are well known and have been successfully implemented for a number of years, $NO_x$ removal chemistries compatible with these $SO_x$ removal systems are not effective.

It is an object of the present invention to provide a low cost process for the removal of both $SO_x$ and $NO_x$ which eliminates the need for a spray dryer.

SUMMARY OF THE INVENTION

In one aspect of the present invention a method of removing both sulfur and nitrogen oxides is provided. A dry alkaline reactant, such as partially spent sorbent material, is injected into ductwork carrying flue gas exiting the boiler/air preheater for removing nitrogen oxides. Subsequent injection of an alkaline slurry into the ductwork removes sulfur oxides. In the nitrogen oxides removal section, conditions are conducive to effective removal of nitrogen oxides with dry sorbent powder. In the sulfur oxide removal section, the simultaneous absorption of sulfur oxides and drying of the sorbent slurry results in the formation of dry alkaline sulfate and sulfite materials. The flue gas along with its entrained particulate material comprised of sorbent, spent sorbent, and flyash is directed to a particulate collection device such as a fabric filter baghouse or an electrostatic precipitator. A portion of the collected material is recycled and the remainder disposed.

In another embodiment of the present invention, nitrogen oxides and sulfur oxides are removed by a method in which the sorbent, which can comprise fresh alkaline reagent and recycled reagent which has been collected in the particulate collection system, is dispersed in dry form into a flue gas ductwork, downstream of the boiler/air preheater. Nitrogen oxides removal, along with some sulfur oxides removal occurs in the dry region. Some distance downstream the flue gas is humidified by introducing a fine spray of water or steam. This results in an increase in water vapor content and a reduction in temperature, with resultant absorption of sulfur oxides by the alkaline sorbent. The flue gas stream containing the dispersed solids is then ducted to a particulate collection device such as a fabric filter baghouse or electrostatic precipitator. A portion of the collected material is recycled and the remainder disposed.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

FIG. 2 is a process flow diagram showing ductwork injection with humidification with $SO_x$ and $NO_x$ removal in accordance with another embodiment of the present invention;

DETAILED DESCRIPTION OF THE INVENTION

Figure 1:
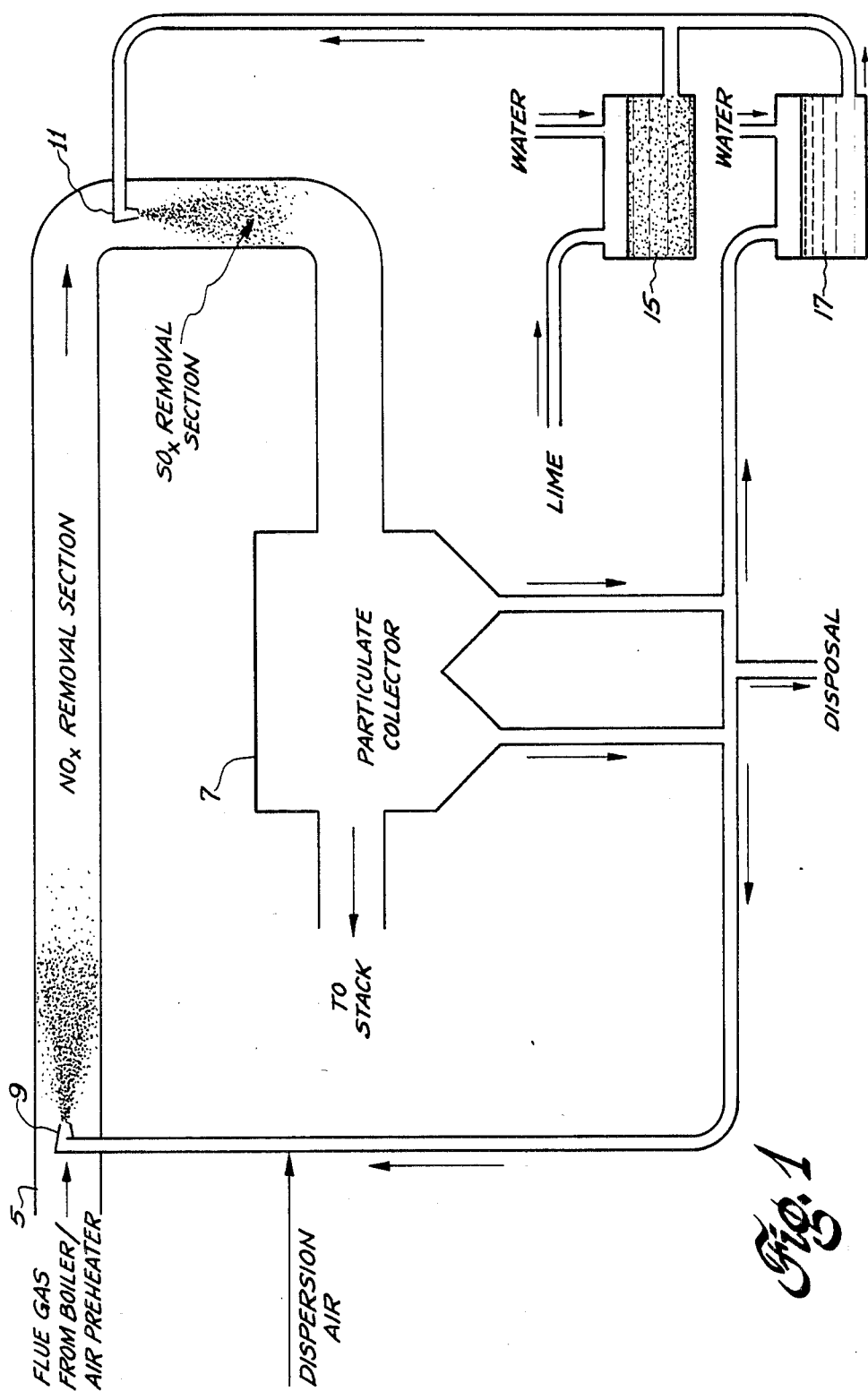
FIG. 1 is a process flow diagram showing ductwork with $SO_x$ and $NO_x$ removal in accordance with the present invention.

Referring now to the drawing and particularly FIG. 1 thereof, dry sorbent for the removal of $NO_x$ and some $SO_2$ is injected into a duct 5 carrying flue gas from a boiler, such as a coal fired boiler with air preheater. The dry sorbent material, which comprises an alkaline material such as lime, or preferably, partially spent sorbent and flyash which has been collected in a particulate collection device downstream, is injected in duct 5 to achieve good dispersion of the powder into the flue gas by using a dry atomizer 9 or alternatively a venturi. A cyclone contactor could alternatively be used to achieve good gas powder contact. In the ductwork carrying flue gas from the boiler and air preheater, NO removal is favored due to the relatively high temperature (250°–500° F.), low humidity, and high $SO_2$ partial pressure. Approximately 10 to 100 feet of flue gas ductwork comprises the NO removal section of the duct beginning with sorbent injection 9 and continuing downstream. A water slurry comprising fresh alkaline sorbent such as lime and recycled sorbent from the particulate collection device is injected into a section of the duct downstream of the NO removal section. The slurry injection device may be a bank of spray nozzles 11 or a rotary atomizer. The slurry simultaneously dries and absorbs $SO_x$ from the flue gas stream. The particulate laden flue gas is ducted to a particulate collection device 7 such as a baghouse or electrostatic precipitator (not shown). The particulate free gas is sent to a stack. A portion of the partially spent sorbent solids removed from the particulate collection device is recycled in dry form to the injector 9 in the NO removal section of the flue gas duct. Part of the partially spent sorbent is mixed with water in a slurry tank 15 and sent with lime which has been mixed in slurry tank 17 to spray nozzle bank 11 of the $SO_2$ absorber atomizer.

Another embodiment of the invention is shown in FIG. 2. In this process, dry sorbent for $NO_x$ and $SO_x$ removal are injected into ductwork 23 downstream from the boiler with air preheater. A dry powder atomizer 25 is used to achieve good dispersion of the dry sorbent into the flue gas. Alternatively, a venturi could be used to disperse the dry sorbent. In the ductwork after the preheater, conditions exist which are conducive to the efficient removal of NO. These include relatively high temperature, high $SO_2$ concentration, and low humidity. At a point downstream in the duct 23, approximately 10 to 100 feet from the point at which the dry sorbent is introduced, humidification water is atomized into the ductwork to promote $SO_2$ removal through reaction with the sorbent using an atomizer 27. The reduced temperature and increased humidity create a condition favorable for $SO_2$ absorption by the alkaline sorbent. The particulate laden flue gas stream is ducted to a particulate collection device 29 such as a fabric filter baghouse or electrostatic precipitator before going to the stack. A portion of the solids from the particulate collection device is recycled to a duct 31 where lime is added prior to injection into duct 23. A major advantage of this process is that since slurries are not injected into the ductwork, scaling of the walls is obviated.

Figure 3A:
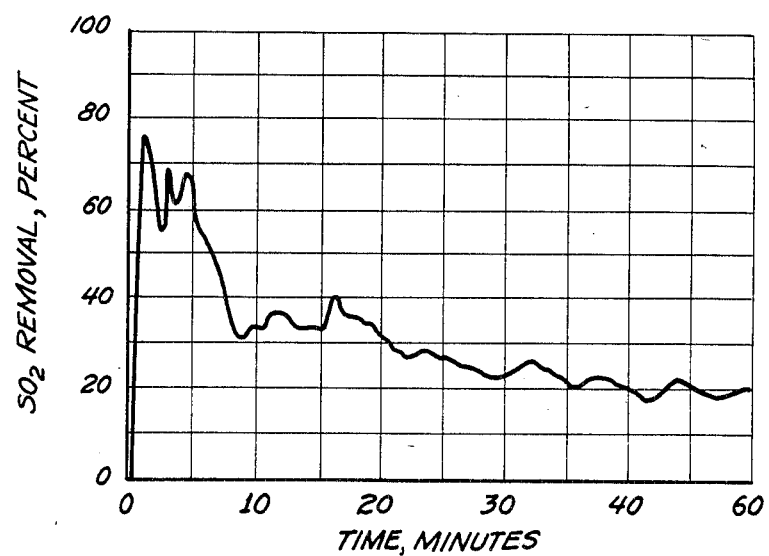
FIGS. 3A and B are graphs showing experimental data from a fluidized bed humidified gas lab setup for $SO_2$ removal versus time and NO removal versus time, respectively.
Figure 3B:
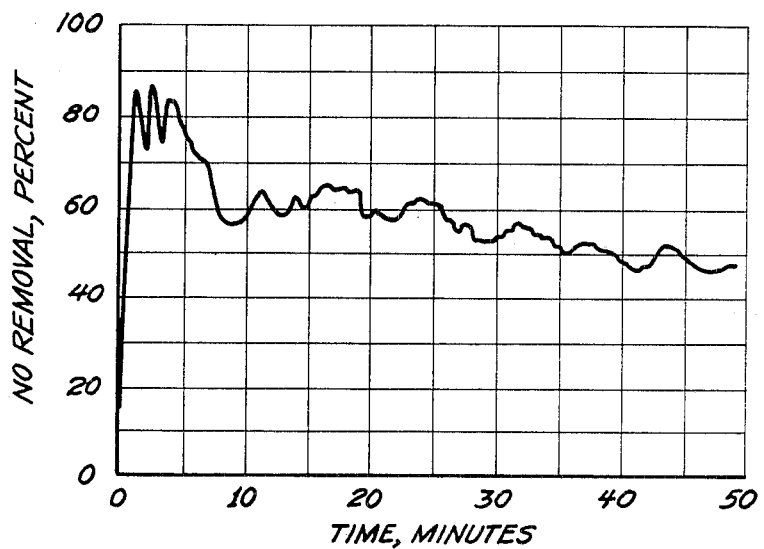

Laboratory experiments were performed to determine the effectiveness of dry recycle sorbent in the removal of $NO_x$ from flue gas streams. The $NO_x$ removal effectiveness was measured in a fluid bed of dry baghouse solids from the Shiras #3 unit of the Marquette, Michigan Board of Light and Power facility. Conditions typical of flue gas exiting an air preheater and entering a spray dry FGD absorber were used. The temperature was 150° C. (302° F.), $SO_2$ concentration was 3000 ppm, NO was 500 ppm, $CO_2$ was 12%, Oxygen was 5%, some water was added for humidification, and the balance was Nitrogen. A 2-inch diameter bed with a fluidized depth of 1 to 2 inches of dry baghouse solids was used. The simulated flue gas flow rate was typically 87 cc/sec, and the weight of baghouse solids was 60 grams. FIGS. 3A and 3B show the percent $SO_2$ and NO removal, respectively, for the fluidized bed operating under these conditions. Because the bed is operated in a batch mode, removal efficiency decreases with time. It is noteworthy that NO removals as high as 80% with a steady value of about 60% were achieved. $SO_2$ removals ranging from 35% to 70% were achieved.

Figure 4A:
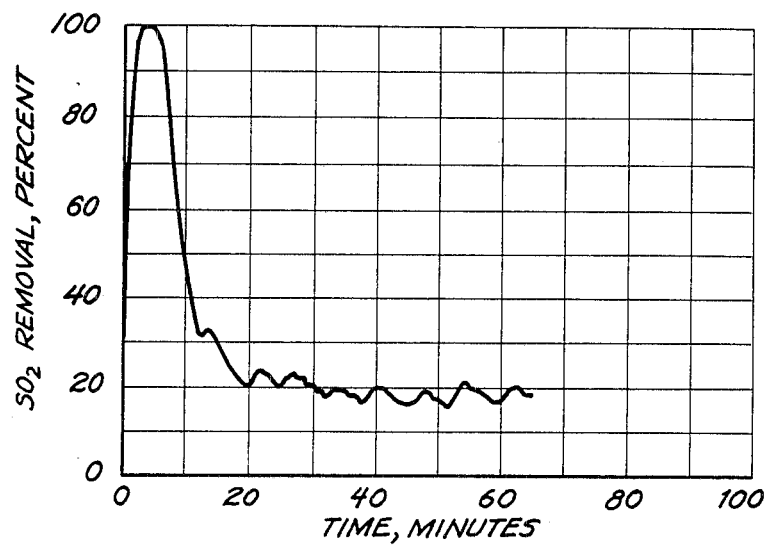
FIGS. 4A and B are graphs showing experimental data from a fixed bed humidified gas lab setup for $SO_2$ removal versus time and NO removal versus time, respectively.
Figure 4B:
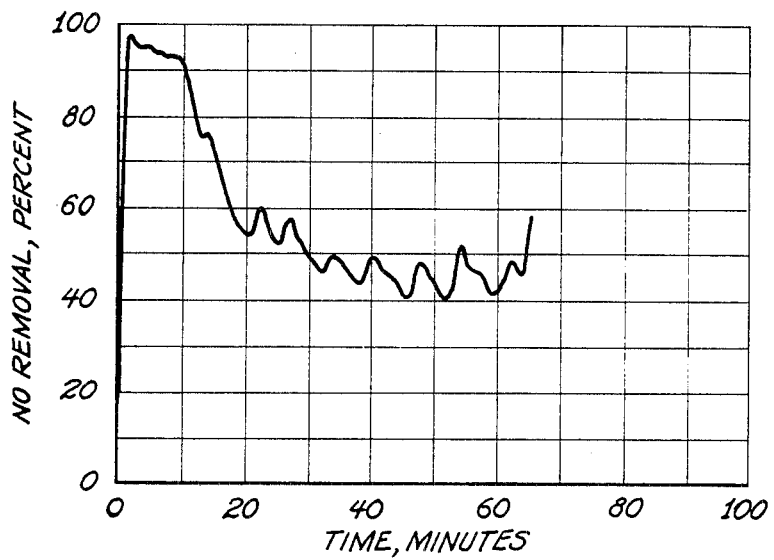
Figure 5A:
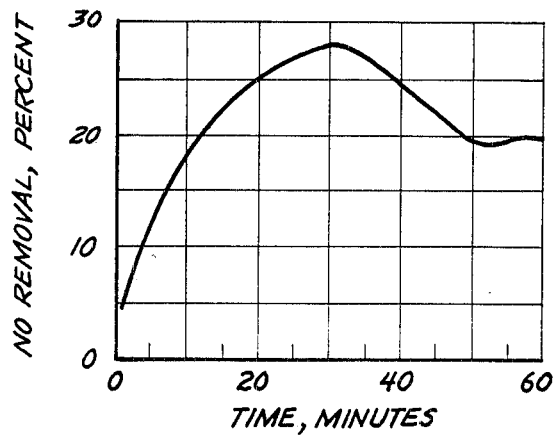
FIGS. 5A and B are graphs showing experimental data from a fixed bed humidified gas lab setup at a lower temperature than the graphs in FIGS. 4A and B for NO removal versus time and $SO_2$ removal versus time, respectively.
Figure 5B:
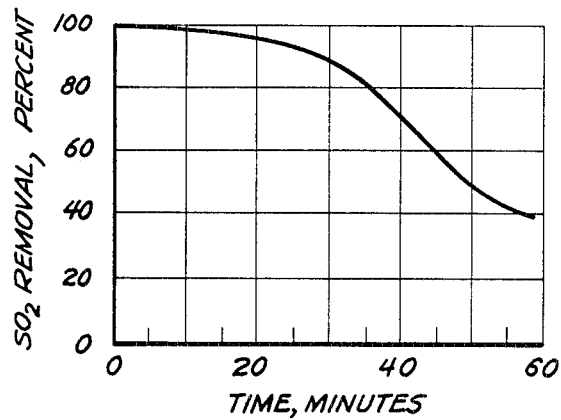

Laboratory fixed bed experiments were also performed for a range of temperatures and using the Marquette baghouse solids as well as simulated recycle sorbent material. In these experiments, bed depths of ¼ to ½-inch and simulated flue gas flow rates of 60 to 90 cc/sec were used, giving residence times for the gas to be in contact with the solid sorbent of from 0.7 to 1 second. FIGS. 4A and 4B show $SO_2$ and NO removal at 150° C. for the simulated flue gas composition previously described. After an initially high value, the NO removal ranges from 40 to 60%. The steady $SO_2$ removal efficiency is about 20%. As shown in FIG. 5A when the temperature was lowered to 100° C. and the $SO_2$ and NO concentrations reduced to 300 ppm, NO removal efficiencies were in the range of 20 to 25%. However, as shown in FIG. 5B, $SO_2$ removal efficiencies are substantially increased. At 70° C. NO removal further declined to about 10 to 20%. Reduction of the $SO_2$ concentration to 100 ppm resulted in the decline of NO removal to below 10%. We also found that at temperatures of less than 100° C., the presence of water resulted in a decline in NO removal efficiency, whereas at 150° C., water seemed to have no effect.

From the above experiments it was determined that NO removal is favored by high temperature, high $SO_2$ concentration, and low humidity. Conditions for highest NO removal exist upstream of the spray dry $SO_2$ absorber.

Thus, effective NO removal can be achieved by dry recycle sorbent injection into the flue gas stream prior to its entry into the $SO_2$ absorber. The previously discussed experiments also show that residence times in the NO removal section can be about 1 second or less.

The foregoing describes a low cost duct injection process with $SO_x$ and $NO_x$ removal capability which eliminates the expensive spray dryer needed in conventional spray dry flue gas desulfurization processes.

While the invention has been particularly shown and described with reference to preferred embodiments thereof, it will be understood by those skilled in the art that various changes in form and details may be made without departing from the spirit and scope of the invention.

What is claimed is:

1. A method of scrubbing nitrogen oxides and sulfur oxides from flue gas comprising the steps of:
   dispersing a dry alkaline powder into a flue gas duct carrying flue gas from a boiler and air preheater to remove nitrogen oxides and some sulfur oxides at a temperature of 250° to 500° F.;
   introducing an aqueous alkali slurry into the flue gas duct at a point downstream of the dry sorbent injection point, said aqueous alkali slurry simultaneously drying and absorbing additional sulfur oxides from the flue gas,
   directing the flue gas to a particulate collection device to remove the dry partially spend sorbent and flyash; and
   directing the flue gas to a stack.

2. The method of claim 1 further comprising the steps of:
   recycling a portion of the dry partially spent sorbent and flyash as alkaline powder and recycling a portion of the dry partially spend sorbent and flyash as an aqueous alkali slurry.

3. The method of claim 2 wherein said dry alkaline powder comprises lime, and partially spent sorbent and flyash removed as a by-product of the process.

4. The method of claim 2 wherein said dry alkaline powder comprises alkali carbonate, and partially spent sorbent and flyash removed as a by-product of the process.

* * * * *